United States Patent

Day et al.

[15] 3,685,489
[45] Aug. 22, 1972

[54] METHOD OF AND TANK FOR HATCHING CRUSTACEA

[72] Inventors: John J. Day; Paul S. Hirschman, both of Fort Lauderdale, Fla.

[73] Assignee: Ocean Protein Corporation, New York, N.Y.

[22] Filed: Dec. 24, 1969

[21] Appl. No.: 887,814

[52] U.S. Cl. ................................................. 119/2
[51] Int. Cl. ............................................ A01k 61/00
[58] Field of Search .................... 119/2, 3, 4, 5, 21, 29

[56] References Cited

UNITED STATES PATENTS

| | | | |
|---|---|---|---|
| 2,920,606 | 1/1960 | Anderson | 119/2 |
| 3,086,497 | 4/1963 | Novello | 119/2 |
| 2,984,207 | 5/1961 | Drake | 119/2 |
| 2,804,045 | 8/1957 | Scott | 119/2 |
| 3,540,414 | 11/1970 | Maloney, Jr. | 119/2 |

*Primary Examiner*—Aldrich F. Medbery
*Attorney*—Darby & Darby

[57] ABSTRACT

A tank apparatus and method for providing advantageous environment for the hatching and early development of crustacean larvae. A plurality of hatching chambers, each having an adjacent larval chamber, with a low bulkhead separating the larval chamber from the hatching chamber. Light sources near the larval chambers cause larvae to migrate to the latter chambers when the water level is above the bulkhead and the screening is removed. A removable screen mesh can be mounted atop the bulkhead to contain the larvae in the larval chamber.

23 Claims, 2 Drawing Figures

PATENTED AUG 22 1972   3,685,489
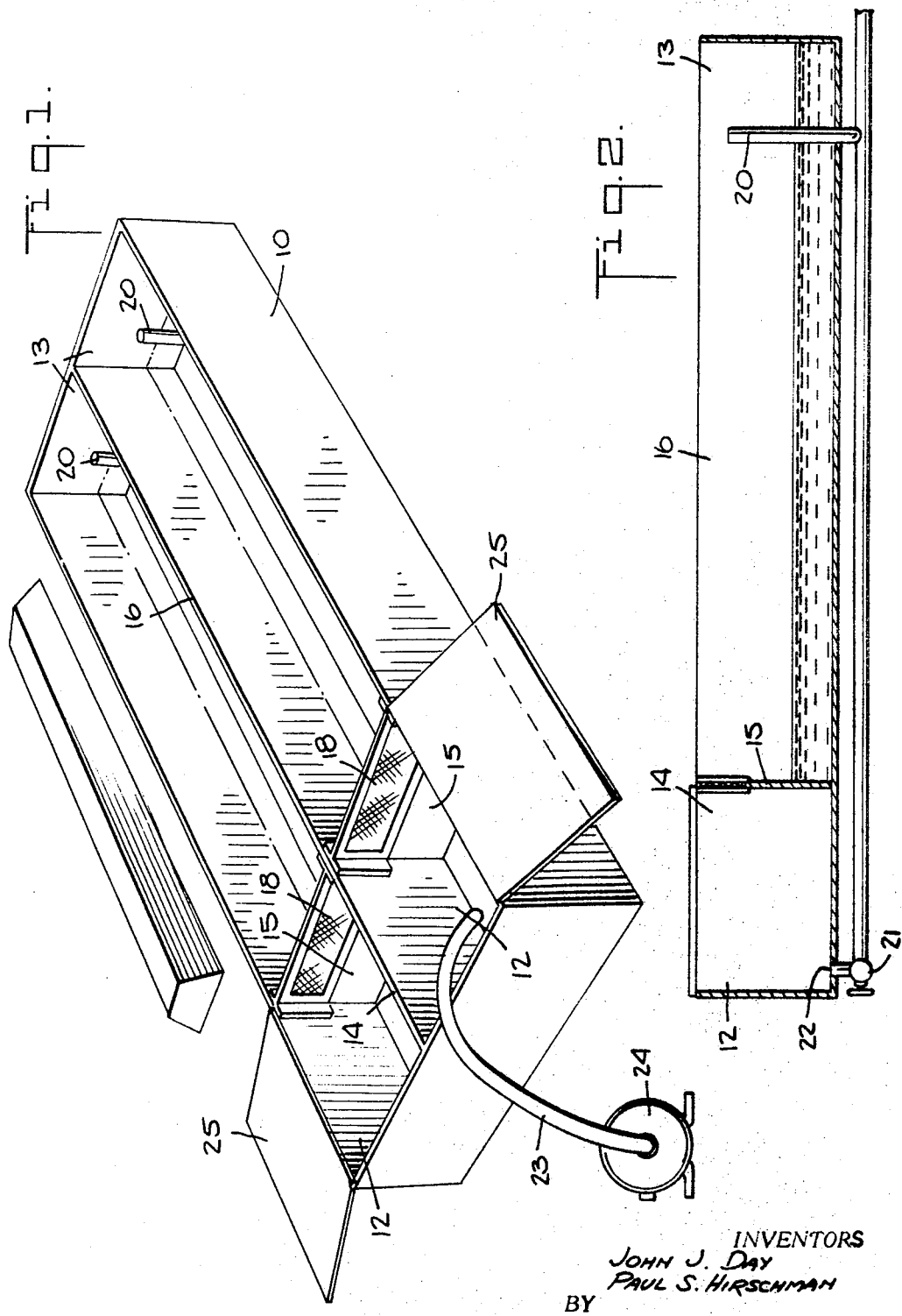
INVENTORS
JOHN J. DAY
PAUL S. HIRSCHMAN
BY
ATTORNEYS

METHOD OF AND TANK FOR HATCHING CRUSTACEA

BACKGROUND OF THE INVENTION

1. Field of the Invention

This invention relates to an apparatus and method for providing an optimum environment for the hatching and early development of crustacean larvae.

2. Description of the Prior Art

The prior art relevant to the husbandry of crustaceans is generally primitive. A widely used practice is to simply place large numbers of crustacea of similar age into a contained pond and allow them to grow, harvesting some crustaceans from time to time.

One of the problems with this practice is that crustaceans, especially shrimp, tend to be quite cannibalistic.

This cannibalistic tendencey becomes evident at an early age. Shrimp larvae which hatch in the presence of other larvae only a few days older are in danger of being eaten by their elders, since the early development is quite rapid, and a few days' additional age will enable a shrimp larvae to grow large enough to eat newly hatched larvae.

It is an object of this invention to provide an apparatus and method whereby newly hatched crustacea are protected from the cannibalistic tendency of their species.

Larvae often require water conditions different from those suitable for adult crustaceans.

It has been found that in order to obtain optimum growth and survival rates of young shrimp or other crustaceans, it is highly useful to exert precise control over water conditions. A single hatching of shrimp can yield from 50,000 to 100,000 larvae. These immense numbers of larvae can cause the water to be contaminated with waste products and food. This contamination is deleterious to the development of the larvae. Also, precise temperature control over the water is desirable. Furthermore, for certain species such as certain *Macrobrachium carcinus* species, it has been found desirable to hatch the young shrimp in fresh water, and within a short time alter their surroundings to obtain a desired salinity. Experiments with the species *Macrobrachium carcinus* indicates that optimum salinity is between 12 and 20 parts per thousand of salt in water.

As is obvious, it would be extremely difficult to exert this type of water control over an entire large pond, in order to promote the most rapid and successful development of larvae. Furthermore, even if this could be done, it would probably not be desirable to the entire shrimp community present in the pond to alter significantly the salinity of the water.

Another object of this invention is to enable frequent treatment of the water environment of the larvae without disturbing or damaging them.

SUMMARY OF THE INVENTION

This invention is an apparatus and method for providing an optimum environment for the hatching and development of shrimp or other crustacean larvae. The apparatus comprises a tank containing a number of hatching chambers separated from one another by solid walls. Each hatching chamber has adjacent to it a larval chamber, the two chambers being separated by a bulkhead. Removable screen mesh dividers are provided to be inserted at will atop the bulkheads. Light sources are positioned near each of the larval chambers.

The shrimp are hatched in the hatching chambers, and the light sources turned on. This causes the shrimp larvae to migrate over the bulkhead, if the water level is sufficiently high. Once inside the larval chambers, the screens are positioned to prevent re-entry into the hatching chambers. With the larvae thus contained, operations can be performed upon the water in both chambers without danger of injuring the larvae. This is done by operating in the vacated hatching chamber.

DESCRIPTION OF DRAWINGS

FIG. 1 is a perspective view of the hatching tank of this invention, showing hatching and larval chambers, bulkheads, screen mesh, light sources and standpipes.

FIG. 2 is a side view of the hatching tank of this invention, partly in cross-section showing the standpipe, drainpipe and valve arrangements for controlling the water environment within the tank.

DESCRIPTION OF THE INVENTION

The basic component of the hatching tank is tank body 10. Tank 10 is approximately 20 feet long, 8 feet wide and 3 feet in depth. Within tank body 10 are located a number of adjacent hatching chambers 12, each separated from the others by solid wall 14. Adjacent each hatching chamber 12 is a larval chamber 13. Each larval chamber is separated from its adjacent hatching chamber by a low bulkhead 15. Bulkhead 15 is about 2 feet high. Bulkhead 15 may be removable if desired, but may be permanently joined to the bottom of the tank body 10.

Removable screen mesh dividers 18 are provided, one to each bulkhead, and are capable of being removably mounted vertically atop each of bulkheads 15. The larval chambers are separated from one another by solid walls 16.

Standpipes 20, drainpipes 22, and valve 21 control overflow of water from the tanks. Hoses 23 and pump 24 are also provided in order to enable insertion or removal of water from the tanks.

In order to utilize this invention, a female crustacean, such as a shrimp of the species *Macrobrachium carcinus*, bearing fertilized eggs is placed in each hatching chamber 12. The water level of hatching chamber 12 is below the level of bulkhead 15 so that initially there is no circulation of water between larval chambers 13 and hatching chambers 12. The water in hatching chamber 12 contains little or no salt, while the water in the larval chamber can be kept at any desired salinity.

Removable covers 25 are provided to cover hatching chambers 12. The reason for this is that it is desirable for the female to remain quite calm and quiescent during the hatching process. Darkness encourages calm.

Sufficient salt is placed in larval chamber 13 such that when the water level in hatching tank 12 is raised to its maximum desirable level after hatching, and thus spills over bulkhead 15, the entire volume of water in the unit comprising hatching chamber 12 and larval chamber 13 will contain salt in a desired ratio of approximately 12 and 20 parts per thousand by weight of salt to water.

During the hatching process, however, the water level is kept below the level of bulkhead 15. When the shrimp larvae begin to hatch they can be seen with the naked eye when hatching tank 12 is carefully examined. The hatching process itself takes only a few hours, and from 50,000 to 100,000 larvae per hatch are obtained.

The female is allowed to remain in the hatching chamber for from 24 to 48 hours after larvae are first observed. This assures the completion of hatching. The female is then removed from the hatching chamber and returned either to a mating tank or to her normal environment. This leaves the larvae swimming alone in the hatching chamber, in a medium of fresh water.

At this point, pump 24 and hose 23 are utilized to fill hatching chamber 12 to a level such that the water spills over bulkhead 15 into larval chamber 13. The water is allowed to continue to rise until the maximum desirable water level is reached with both the hatching chamber and larval chambers filled, and the water level several inches above the top of bulkhead 15. The entry of water from hatching chamber 12 into larval chamber 13 causes the salt water placed in chamber 13 to mix and disperse throughout both chambers.

Thus, the desired degree of salinity is achieved with respect to all the water in both the hatching and larval tanks, automatically, by simply raising the water level.

Thus far nothing obstructs the larvae from swimming into the larval chamber from the hatching chamber. At this point, covers 25 are placed over hatching chambers 12, darkening them. Light sources 19, near the larval chambers, are turned on. This results in the larval chambers being brightly illuminated with respect to the hatching chambers. It is known that the larvae will migrate toward a source of light, and they therefore swim over bulkhead 15 into larval chamber 13.

After some time, when the larval migration is complete, screen mesh dividers 18 are installed atop bulkhead 15. Screens 18 are of a gauge fine enough to prevent the larvae from retuning to hatching tank 12.

It can be seen that, as soon as the larvae are completely hatched, the female's removal assume that she will not pollute the environment and also negates the possibility that she may devour her young.

It is noted that walls 14 and 16 are solid and do not permit the passage of larvae from one hatching chamber to another, nor from one larval chamber to another. The reason for this is that larvae which are more than a few days old have both the capability and the inclination to devour newborn shrimp larvae. This is an early manifestation of the crustacean's cannibalistic tendency. Therefore, because female egg bearing shrimp in adjacent hatching chambers may hatch their young at different times, the young crustaceans must be kept in separate areas.

As has been noted above, it is critical in the early development of shrimp larvae that, in order to get optimum growth and survival, water conditions be closely controlled. The enormous numbers of shrimp larvae generate substantial quantities of waste material which must be removed at frequent intervals from the water. Water temperature must be maintained within close limits. Waste food must be removed from the water. The water may be changed frequently both to clean it, and in order that there always be plenty of oxygen available to the growing larvae.

If the larvae were allowed to swim about at will through both the hatching and larval chambers, it would be extremely difficult to operate upon, remove water from, or add water to the hatching tank without injuring or pumping out larvae. By means of this invention, however, the larvae are maintained in the volume of the larval chambers, leaving the hatching chamber empty of larvae.

Therefore, pumps and hoses and strainers and the like can be used to treat, remove from, or add water to that which is present in the tank, without fear of either injuring larvae or unwittingly pumping them away.

It is also noteworthy that screens 18, while being too fine to allow larvae to pass, do allow the circulation of water from hatching chamber to larval chamber and back. This means that contamination of the water occurs at a slower rate than it would if the only water available to the larval chamber were that confined within the walls of that chamber itself. Thus, this invention enables the maintenance of greater stability in water conditions than if the larvae were simply confined in the larval chamber, with not water circulation at all.

It should be evident herefrom that this invention is of substantial benefit in the husbandry of very young crustacean life.

What is claimed is:

1. Apparatus to provide a suitable environment for the hatching and early development of crustacea larvae comprising:

a first tank forming a hatching chamber in which the larvae are hatched, said hatching chamber being sufficiently large to hold a gravid female of the species of crustacea being hatched, a second tank forming a larval chamber which is located adjacent to said hatching chamber, said first and second tanks having side and bottom walls and a common dividing wall means intermediate the ends of said side walls including a first member adjoining the floors of said tanks for permitting liquid communication directly between said two chambers when the liquid in said hatching chamber is at a predetermined height with respect to said first member, said common wall means also including a movable second liquid pervious member which is capable of blocking the travel of larvae while still permitting liquid communication between the two chambers, means adjacent said larval chamber for inducing the larvae in said hatching chamber to migrate to said larval chamber past said first member when said second member is moved to a position to permit the larvae to migrate from the hatching chamber to the larval chamber, and means for mounting said second member in a position with respect to said first member for preventing said larvae from returning to said hatching chamber after migration to said larval chamber while still permitting liquid communication between the two chambers.

2. Apparatus as in claim 1 wherein said first member of said common wall means comprises a solid wall of a height less than the depth of said tanks and said second member comprises a mesh, said mounting means including means for mounting said second member above said first member.

3. Apparatus as in claim 1 further comprising means for adding liquid to said hatching chamber.

4. The apparatus of claim 1 wherein said inducing means comprises a light source positioned to illuminate said larval chamber brightly relative to said hatching chamber.

5. Apparatus to provide a suitable environment for the hatching and early development of crustacea larvae comprising:
a fluid containing tank, a bulkhead adjoining the floor of said tank to divide said tank into first and second chambers, said first chamber forming a hatching chamber in which the larvae are hatched and being sufficiently large to hold a gravid female of the species being hatched, and said second chamber forming a larval chamber which is located adjacent said first chamber,
said bulkhead being of a height less than the depth of the tank for permitting liquid communication between said two chambers when the level of the liquid is above the height of said bulkhead, means adjacent said larval chamber for inducing the larvae in said hatching chamber to migrate over said bulkhead to said larval chamber,
and means for preventing said larvae from returning to said hatching chamber after migration to said larval chamber while still permitting liquid communication between said two chambers.

6. Apparatus as in claim 5 wherein said means for preventing return of said larvae to said hatching chamber includes a porous divider member which permits liquid communication between said two chambers while preventing the larvae from returning to said hatching chamber.

7. The apparatus of claim 6 wherein:
said inducing means comprises a light source position to illuminate said larval chamber brightly relative to said hatching chamber.

8. The apparatus of claim 5 further comprising:
means to add and remove water from said hatching chamber, and
drainpipe and standpipe means for controlling the depth of said water in the chambers of said tanks.

9. The apparatus of claim 6 wherein said porous divider is adapted for removable mounting atop said bulkhead.

10. Apparatus to provide a suitable environment for the hatching and early development of crustacea larvae comprising:
a first tank forming a plurality of hatching chambers in which the larva is hatched, each said hatching chamber being sufficiently large to hold a gravid female of the species of crustacean being hatched,
first wall means impervious to larvae and to the female crustacea for separating adjacent hatching chambers,
a second tank forming a plurality of larval chambers, each larval chamber being adjacent a corresponding hatching chamber,
second wall means impervious to larvae for separating adjacent larval chambers,
means adjacent said larval chambers for inducing the larvae in a hatching chamber to migrate to the corresponding larval chamber,
a common wall means between each hatching chamber and the corresponding larval chamber, said common wall means including a first member adjoining the floors of the tanks to permit fluid to flow between the chambers when the water level in one chamber is at a predetermined height with respect to said first member, said common wall means also including a movable second water pervious member adjacent said first member defining a means for blocking the travel of larvae while still permitting liquid communication between the two chambers,
and means for mounting said second member in a position with respect to said first member for preventing the larvae in a respective larval chamber from returning to the corresponding hatching chamber after migration to a said larval chamber while still permitting liquid flow between the two chambers.

11. The apparatus of claim 10 wherein:
said inducing means comprises a light source positioned to illuminate each said larval chamber brightly relative to the corresponding hatching chamber.

12. Apparatus to provide a suitable environment for the hatching and early development of crustacea larvae comprising a fluid containing tank, first wall means in said tank impervious to larvae for dividing the interior thereof into a plurality of hatching chambers in which the larvae are hatched, each said hatching chamber being sufficiently large to hold a gravid female of the species being hatched, second wall means in said tank impervious to larvae forming a plurality of larval chambers, each larval chamber being adjacent a corresponding hatching chamber, a bulkhead adjoining the floor of said tank between a corresponding hatching chamber and a larval chamber, said bulkhead being of a height less than the depth of the tank for permitting liquid communication between the corresponding hatching and larval chambers when the level of liquid in the tank is above the height of said bulkhead, means adjacent said larval chambers for inducing the larvae in a hatching chamber to migrate to the corresponding larval chamber, and means adjacent each pair of larval and hatching chambers for preventing larvae from returning to a hatching chamber after migration to a corresponding larval chamber while still permitting liquid communication between the two chambers.

13. Apparatus as in claim 12 wherein each said means for preventing return of said larvae from a larval chamber to the corresponding hatching chamber includes a porous divider member which permits liquid communication between two corresponding chambers while preventing the larvae from returning to a corresponding hatching chamber.

14. The apparatus of claim 13, wherein said porous divider is removably mounted atop said bulkhead.

15. The apparatus of claim 13 wherein:
said inducing means comprises a light source positioned to illuminate each said larval chamber brightly relative to the corresponding hatching chamber.

16. A method of providing a suitable environment for hatching and early development of crustacean larvae, said method comprising the steps of:

a. physically isolating a female crustacean bearing fertilized eggs in a hatching chamber containing a liquid into which the female hatches the eggs which become larvae, said hatching chamber being adjacent a larval chamber and said hatching chamber being divided from said larval chamber by a bulkhead adjoining the bottom of said chambers and of a height less than the depths of said chambers, b. maintaining the liquid in said hatching chamber at a level below the height of said bulkhead before hatching of said larvae, c. raising said water level above said bulkhead after said larvae are hatched, and d. inducing newly hatched larvae to migrate from said hatching chamber to said larval chamber.

17. A method according to claim 16 wherein said inducing step comprises illuminating said larval chamber brightly relative to said hatching chamber.

18. A method according to claim 16 further comprising the step of containing the larvae in said larval chamber by placing between said larval and hatching chambers a porous divider after inducing migration of said larvae.

19. A method according to claim 17 further comprising the step of containing the larvae in said larval chamber by placing between said larval and hatching chambers a porous divider after inducing migration of said larvae.

20. The method of claim 16, further comprising the step of:
adding salt to said larval chamber before said raising of said water level.

21. The method of claim 16 further comprising the step of:
mounting a removable porous divider atop said bulkhead after said migration of said larvae.

22. The method of claim 21 further comprising the step of:
changing the volume of and treating the water in said hatching and larval chambers by means of operations carried on in said hatching chamber, after said raising of said water level.

23. A method of providing a suitable environment for hatching and early development of crustacean larvae, said method comprising the steps of:

a. physically isolating a female crustacean bearing fertilized eggs in a hatching chamber containing a liquid into which the female hatches the eggs which become larvae, said hatching chamber being adjacent a larval chamber and said hatching chamber being divided from said larval chamber by a common wall having a first member and a movable second liquid pervious member which is capable of blocking the travel of larvae, b. locating said second member in a position with respect to said first member to permit the travel of the larvae from the hatching chamber past said first member to the larval chamber, c. inducing newly hatched larvae to migrate from said hatching chamber to said larval chamber, and d. positioning said second member with respect to said first member to prevent the larvae from migrating back to said hatching chamber from said larval chamber while still permitting liquid to flow between said chambers through said second member.

* * * * *